United States Patent
Kubota et al.

(10) Patent No.: US 9,760,270 B2
(45) Date of Patent: Sep. 12, 2017

(54) VEHICULAR ELECTRONIC DEVICE

(71) Applicant: HONDA MOTOR CO., LTD., Tokyo (JP)

(72) Inventors: Mototsugu Kubota, Utsunomiya (JP); Tomohisa Manabe, Saitama (JP); Junichiro Onaka, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/784,394

(22) PCT Filed: Feb. 12, 2014

(86) PCT No.: PCT/JP2014/053124
§ 371 (c)(1),
(2) Date: Oct. 14, 2015

(87) PCT Pub. No.: WO2014/171171
PCT Pub. Date: Oct. 23, 2014

(65) Prior Publication Data
US 2016/0062626 A1 Mar. 3, 2016

(30) Foreign Application Priority Data
Apr. 16, 2013 (JP) .................... 2013-085955

(51) Int. Cl.
*G06F 3/0484* (2013.01)
*G06F 3/0488* (2013.01)
(Continued)

(52) U.S. Cl.
CPC .......... *G06F 3/04847* (2013.01); *B60K 35/00* (2013.01); *B60K 37/06* (2013.01);
(Continued)

(58) Field of Classification Search
CPC . G06F 3/00; G06F 3/016; G06F 3/017; G06F 3/041; G06F 3/0416; G06F 3/048;
(Continued)

(56) References Cited

U.S. PATENT DOCUMENTS

| 6,686,911 B1 * | 2/2004 | Levin ................. G06F 3/016 345/156 |
| 6,760,696 B1 * | 7/2004 | Goldberg ............ G06F 1/1626 704/201 |

(Continued)

FOREIGN PATENT DOCUMENTS

| JP | 11-105646 | 4/1999 |
| JP | 2004-118383 | 4/2004 |

(Continued)

OTHER PUBLICATIONS

International Search Reported dated Apr. 8, 2014, Application No. PCT/JP2014/053124, English translation included.

*Primary Examiner* — Xiomar L Bautista
(74) *Attorney, Agent, or Firm* — Rankin, Hill & Clark LLP

(57) ABSTRACT

A vehicular electronic device such that volume increase/decrease adjustment can be easily performed using a volume switch displayed on a touch-panel type display unit. Upon detection of a touch operation in a reference volume switch region displayed in an operation region of the display unit, an operation area enabling volume increase/decrease is enlarged from the reference volume switch region to a wide-region volume switch region. Thus, the operation for increasing or decreasing (adjusting) volume (volume increase/decrease operation) can be easily performed.

14 Claims, 9 Drawing Sheets

(51) Int. Cl.
*B60K 37/06* (2006.01)
*B60K 35/00* (2006.01)
*G06F 3/041* (2006.01)
*G06F 3/16* (2006.01)

(52) U.S. Cl.
CPC ............ *G06F 3/041* (2013.01); *G06F 3/0488* (2013.01); *G06F 3/04883* (2013.01); *G06F 3/04886* (2013.01); *G06F 3/165* (2013.01); *B60K 2350/1004* (2013.01); *B60K 2350/1032* (2013.01)

(58) Field of Classification Search
CPC .... G06F 3/0481; G06F 3/0484; G06F 3/0485; G06F 3/0488; G06F 3/04842; G06F 3/04847; G06F 3/04883; G06F 3/04886; G06F 3/16; G06F 3/164; G06F 7/00; G09G 5/00; B06R 16/02
See application file for complete search history.

(56) References Cited

U.S. PATENT DOCUMENTS

| | | | | |
|---|---|---|---|---|
| 6,819,990 | B2 * | 11/2004 | Ichinose | B60K 35/00 701/1 |
| 7,683,771 | B1 * | 3/2010 | Loeb | B60K 35/00 340/438 |
| 2004/0107072 | A1 * | 6/2004 | Dietrich | G01C 21/206 702/153 |
| 2006/0047386 | A1 * | 3/2006 | Kanevsky | B60K 35/00 701/36 |
| 2008/0016443 | A1 * | 1/2008 | Hiroshima | G01C 21/3664 715/702 |
| 2008/0051970 | A1 * | 2/2008 | Oh | G06F 3/14 701/93 |
| 2009/0189373 | A1 * | 7/2009 | Schramm | B60K 35/00 280/731 |
| 2009/0315867 | A1 * | 12/2009 | Sakamoto | G06F 3/03547 345/184 |
| 2010/0268426 | A1 * | 10/2010 | Pathak | G06F 3/03547 701/48 |
| 2011/0082627 | A1 * | 4/2011 | Small | B60K 35/00 701/48 |
| 2012/0144299 | A1 * | 6/2012 | Patel | G06F 3/0488 715/702 |
| 2013/0120293 | A1 * | 5/2013 | Jeon | G06F 3/01 345/173 |
| 2013/0121510 | A1 * | 5/2013 | Yuasa | H03G 3/02 381/109 |
| 2013/0265248 | A1 * | 10/2013 | Nagahara | G06F 3/041 345/173 |

FOREIGN PATENT DOCUMENTS

| | | |
|---|---|---|
| JP | 2006-277588 | 10/2006 |
| JP | 2008-083946 | 4/2008 |
| JP | 2008-146429 | 6/2008 |
| JP | 2011-103141 | 5/2011 |

* cited by examiner

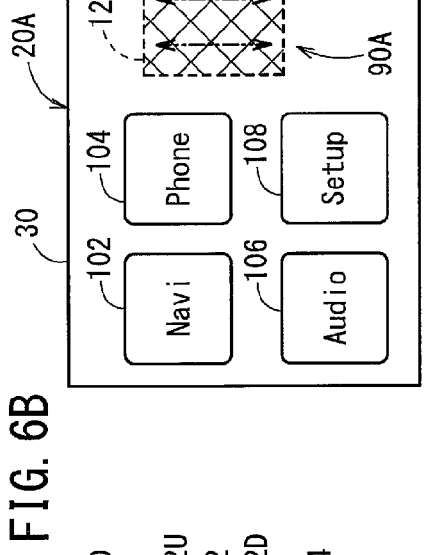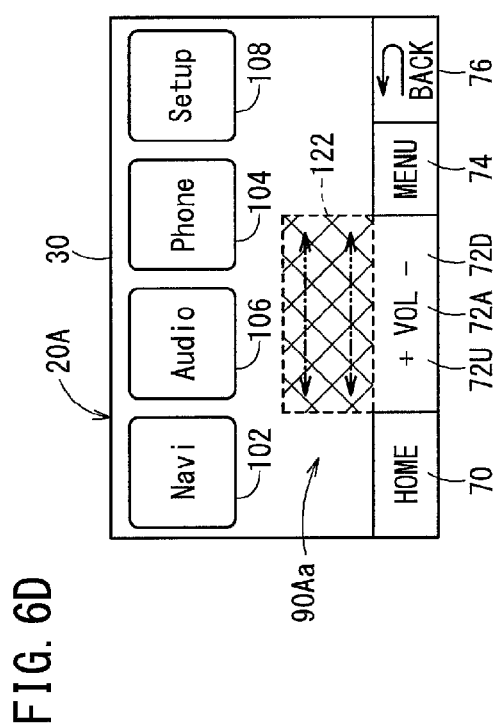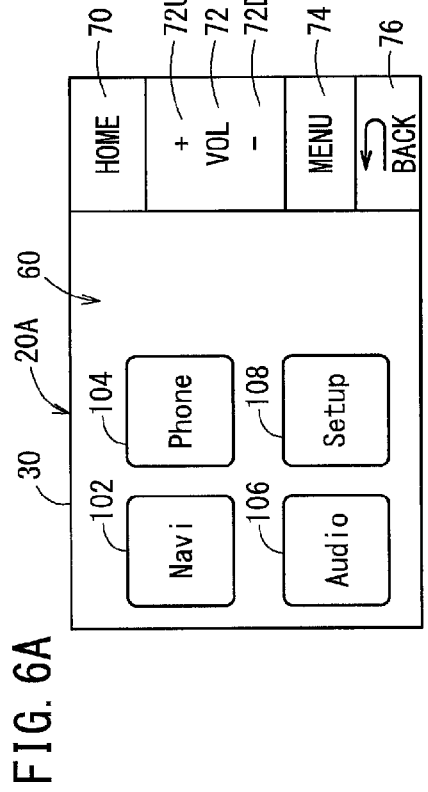

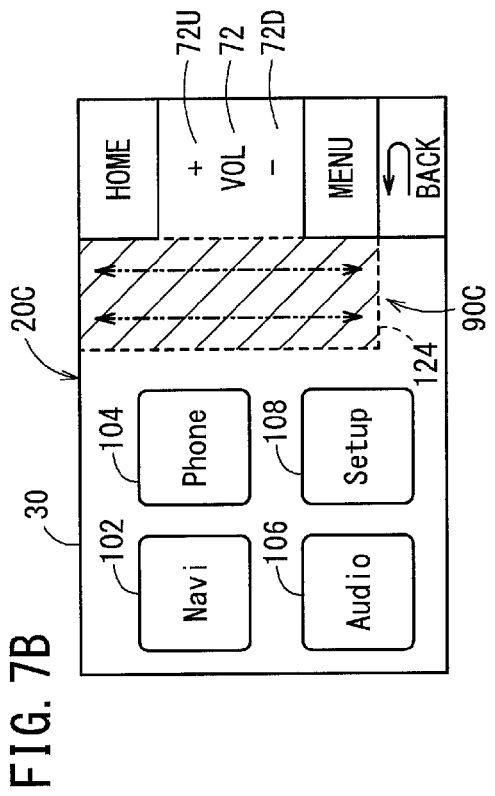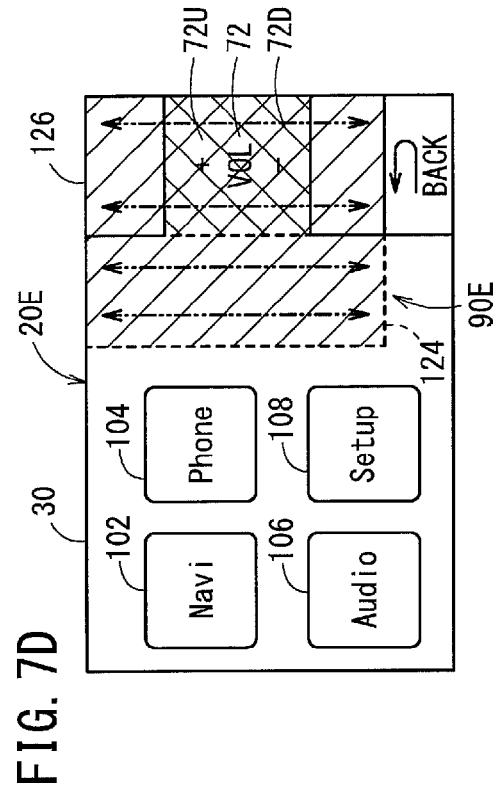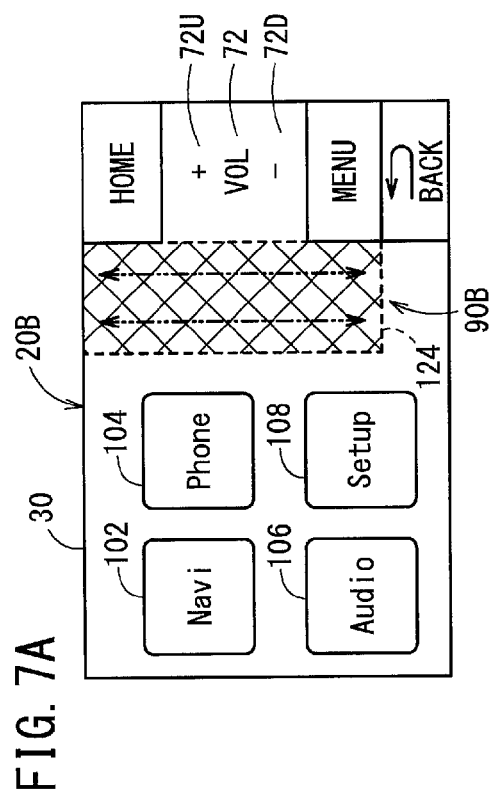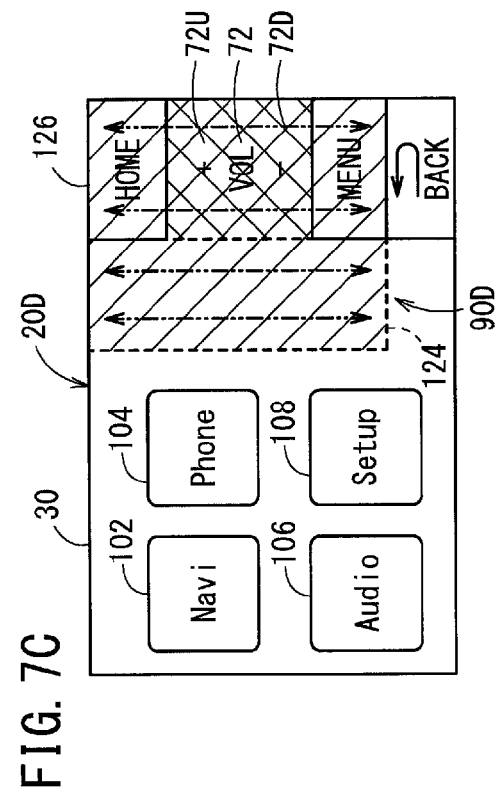

VEHICULAR ELECTRONIC DEVICE

TECHNICAL FIELD

The present invention relates to a vehicular electronic device for increasing or decreasing (adjusting) the volume of an audio device by a volume switch that is displayed on a touch panel type display unit.

BACKGROUND ART

Conventionally, for example, as disclosed in Japanese Laid-Open Patent Publication No. 2004-118383 (JP2004-118383A), a virtual switch providing device has been proposed as an electronic device for increasing or decreasing volume by a volume switch that is disposed on a touch panel type display unit.

With the virtual switch providing device disclosed in JP2004-118383A, as shown in FIGS. 4 and 5 thereof, a small circle, in which an indicator is arranged in one location on the circumference, is displayed in a display unit as a volume switch. When the indicator is touched by a finger on the small circle, while a positional relationship between the touch position and the indicator is maintained, the small circle is enlarged into a large circle, and an operation enabling range for the volume is displayed on the circumference of the large circle.

In JP2004-118383A, for setting a desired volume position, a technique is disclosed in which a selection can be made to subject the indicator to a slide operation (a movement operation of the touched position) along the operation enabling range on the circumference of the large circle, while touching the indicator of the large circle to thereby set a desired volume position, or to cancel touching of the indicator and set a desired volume position (touched position) instantaneously by touching a desired location within the operation enabling range on the circumference of the large circle. It is disclosed that the virtual switch providing device may be applied to an aircraft simulator.

As another conventional technology, although the disclosure thereof is not directly related to the present invention, there can be cited Japanese Laid-Open Patent Publication No. 2008-146429 (JP2008-146429A) as an electronic device equipped with a touch panel type display unit. According to JP2008-146429A, as shown in FIGS. 3, 4, 6, and 7 thereof, five selectable items, i.e., "menu", "backlight correction", "iris adjustment", "effect", and "back", are displayed in vertical alignment on an EVF (electronic view finder), and an upper side selection area and a lower side selection area are provided respectively on upper and lower sides of an external touch panel that supports blind-touch operation. Furthermore, a blank area is disposed between the upper side selection area and the lower side selection area.

With the technique according to JP2008-146429A, for example, a digital video camera is proposed, which is configured such that, at a time that the "menu" item in the uppermost position on the EVF is selected, and when the lower side selection area of the external touch panel is touched, the item "backlit correction", which is one item lower than the "menu" item, is selected. Along therewith, the blank area is incorporated into the lower side selection area, and that portion is controlled so as to enlarge the lower side selection area. Thus, operation mistakes are reduced, in the case that selection of the item "iris adjustment", which is the next lower item, is to be carried out by a blind-touch operation on the touch panel.

SUMMARY OF INVENTION

Incidentally, in a vehicle, as equipment for enhancing comfort therein, vehicular electronic devices such as a navigation system or the like are installed together with AV systems such as an audio device and a video device, etc.

In the place where an increase or decrease (adjustment) of the volume of such a vehicular electronic device was traditionally carried out using a rotary type variable resistor or a rotary type encoder switch, as shown in the aforementioned JP2004-118383A, it may be considered to display as a volume switch a small circle, which is provided with an indicator section in one location on the circumference thereof, on a touch panel type display unit, and to use the same as a volume switch for the vehicular electronic device.

The touch panel type display unit is disposed in the vehicle, for example, on the dashboard (instrument panel) thereof.

However, if one assumes a situation in which the virtual switch according to JP2004-118383A is applied to a touch panel type display unit that is disposed on a dashboard, even if a driver, for example when parked, were to remove and extend one arm away from the handle, and by touching the indicator within the small circle prior to enlargement thereof, were to cause the enlarged circle (the aforementioned large circle) to be displayed as the volume switch on the display unit on the dashboard, it cannot be said to be easy for the driver to slide a finger of his or her extended arm along the large circle, and to smoothly perform a volume increase/decrease operation to a desired volume position, for which delicate movements of the finger are required. Further, also in the case in which touching of the indicator of the large circle is canceled, and a desired volume position is set by touching a desired location within the operation enabling range on the circumference of the large circle, the arm is in an extended state, and thus it is similarly difficult to accurately touch a desired position with the fingertip.

The present invention has been devised taking into consideration the aforementioned problems, and has the object of providing a vehicular electronic device for enabling a volume to easily be increased or decreased (adjusted) by a volume switch that is displayed on a touch panel type display unit.

The vehicular electronic device according to the present invention comprises a touch panel type display unit, and a controller that sets an operation region in the display unit, detects an operation performed in the set operation region, and controls a display of the display unit. The controller, in the case that a reference volume switch region is displayed including a volume increase/decrease switch in the operation region of the display unit, and if a touch operation inside of the reference volume switch region is detected, sets as the operation region a volume switch region, which is another region differing from the reference volume switch region, in a direction that lies perpendicular to the alignment direction of the increase/decrease switch of the reference volume switch region, and detects as a volume increase/decrease operation an operation that is made within the other volume switch region.

According to this invention, when the touch operation to the reference volume switch region that is displayed in the operation region of the display unit is detected, the operation region, which enables an increase or decrease of the volume, is enlarged from the reference volume switch region into a widened volume switch region, which includes both the reference volume switch region and the other volume switch region, and therefore, the operation (volume increase/decrease operation) to increase or decrease (adjust) the volume is made easier.

In this case, the controller may set an alignment direction of the increase/decrease switch to be one of a horizontal direction and an up-down oriented vertical direction.

According to this invention, the direction in which the volume switch region is enlarged can be selected optimally with respect to the position in which the display unit is arranged, or can be selected responsive to a preference of the user.

In this case, in the event that the alignment direction of the increase/decrease switch is set to the vertical direction, the controller sets the other volume switch region, which is the other region differing from the reference volume switch region, horizontally thereto.

According to this invention, in the case that the display unit is arranged, for example, on a dashboard (instrument panel), the driver of the vehicle, for example when the vehicle is parked, removes one hand away from the steering wheel, moves one arm (in the case of a right-hand steering wheel, the left arm; in the case of a left-hand steering wheel, the right arm) in a leftward direction (in the case of a right-hand steering wheel) or a rightward direction (in the case of a left-hand steering wheel), and touches the reference volume switched region.

When touched, the other volume switch region is set in a substantially horizontal direction, which is the movement direction of the arm. Since the volume switch region is enlarged substantially horizontally, the volume switch region becomes enlarged in the direction in which the arm has been moved, and the volume switch region is enlarged in a direction that coincides with the direction of movement of the arm of the user, and therefore, the operation (volume increase/decrease operation) to increase or decrease (adjust) the volume is easy to carry out.

More specifically, since the other volume switch region is set horizontally to the reference volume switch region, the widened volume switch region is set in the same direction as the movement direction (substantially horizontal direction) of the arm used by the driver for operating the reference volume switch region, and the operation to increase or decrease the volume can be carried out smoothly.

In this case, the controller sets in the operation region an enlarged volume switch region, in which the horizontally set other volume switch region is further enlarged upwardly and downwardly, and detects an operation within the enlarged volume switch region as the volume increase/decrease operation. Consequently, since the enlarged volume switch region, in which the other volume switch region has been further enlarged upwardly and downwardly, is set in the operation region, the increase/decrease operation of the volume is made easier.

The controller enables the operation region to be set to a touch operation region in which a touch operation is detected, and a slide-flick operation region in which a slide operation or a flick operation is detected (an operation of at least one of the slide operation and the flick operation will hereinafter also be referred to as a slide-flick operation, or a slide operation-flick operation), and with respect to the reference volume switch region, which is set to the touch operation region, sets the enlarged volume switch region to the slide-flick operation region in which the vertically directed slide operation or flick operation is detected. Accordingly, ease of operation of the volume increase/decrease operation is improved.

Stated otherwise, since a vertically directed slide operation and flick operation can both be used, ease of operation of the volume increase/decrease operation is improved. Further, assuming that the enlarged volume switch region is not the slide-flick operation region, but is such that the applicable region for the touch operation is set the same as the reference volume switch region, in the case that a volume gauge or the like is displayed in the enlarged volume switch region, and in the case that the volume level of the volume gauge is a small value at a lower position than an upper limit position of a decrease switch of the volume increase/decrease switch (increase switch and decrease switch) that is displayed in the reference volume switch region, then although the user attempts to increase the volume, and the increase is in a direction more upwardly than the volume level of the volume gauge, if the user attempts to set a volume level at a position more downwardly than the upper limit position of the decrease switch, in the case that a touch operation is performed on that region, conversely, there is the possibility for a mistaken operation to occur in which the volume is reduced. In relation to this problem, according to the present invention, by disallowing the touch operation within the enlarged volume switch region and setting the same to a slide-flick operation region, such a mistaken operation can be prevented beforehand.

The controller preferably sets a region, which includes the reference volume switch region that is set to the touch operation region and extends over a vertical length of the enlarged volume switch region that resides upwardly and downwardly of the reference volume switch region, to the slide-flick operation region in which the vertically directed slide operation or flick operation is detected.

If set in this manner, when the vertically directed slide operation-flick operation is performed in the enlarged volume switch region, even in the case that the operation is performed at a slant, and the slide operation or the flick operation enters into the reference volume switch region, the operation continues, resulting in a valid volume increase/decrease operation by the slide operation or the flick operation, whereby the operability of the volume increase/decrease operation is significantly enhanced.

Furthermore, when operation regions of other function switches are set upwardly and downwardly of the reference volume switch region, the controller may render invalid operations of the other function switches that reside upwardly and downwardly of the reference volume switch region, and the regions of the other function switches, which have been rendered invalid, may be set to the vertically directed slide-flick operation region. In this manner, by invalidating the other function switches that originally resided upwardly and downwardly of the reference volume switch region, and setting them to the volume slide-flick operation region, during a volume operation, mistaken operation of the other function switches at positions upwardly and downwardly of the reference volume switch region can be prevented beforehand.

In this case, the controller displays within the other volume switch region and within the enlarged volume switch region a GUI, in which it can be recognized that the vertically directed slide operation or flick operation within the other volume switch region, and the vertically directed slide operation or flick operation within the enlarged volume switch region are the volume increase/decrease operation. Thus, in a user friendly manner, a slide operation direction or a flick operation direction, which enables the volume increase/decrease operation, can be recognized intuitively by the user.

Further, if the GUI is a volume gauge in which the current volume level is displayed on the gauge, then the current volume level can be confirmed at a glance.

According to this invention, when the touch operation to the reference volume switch region that includes the volume increase/decrease switch is detected, since a widened region, which includes the reference volume switch region and the other volume switch region that differs from the reference volume switch region, is set to the volume switch region, the volume increase/decrease (adjustment) operation by the volume switch that is displayed in the widened region can easily be carried out.

BRIEF DESCRIPTION OF DRAWINGS

FIG. 6A is a view showing again the home screen shown in FIG. 3A;

FIG. 6B is an explanatory drawing of a volume increase/decrease operation enabling screen of a vehicular display device according to a first exemplary embodiment;

FIG. 6C is an explanatory drawing of a home screen of the vehicular display device according to a modification of the first exemplary embodiment;

FIG. 6D is an explanatory drawing of a volume increase/decrease operation enabling screen of the vehicular display device according to a modification of the first exemplary embodiment;

FIG. 7A is an explanatory drawing of a volume increase/decrease operation enabling screen of a vehicular display device according to a second exemplary embodiment;

FIG. 7B is an explanatory drawing of a volume increase/decrease operation enabling screen of a vehicular display device according to a third exemplary embodiment;

FIG. 7C is an explanatory drawing of a volume increase/decrease operation enabling screen of a vehicular display device according to a fourth exemplary embodiment;

FIG. 7D is an explanatory drawing of a volume increase/decrease operation enabling screen of a vehicular display device according to a fifth exemplary embodiment;

DESCRIPTION OF EMBODIMENTS

Below, preferred embodiments of a vehicular electronic device according to the present invention will be presented in detail with reference to the accompanying drawings.

Figure 1:
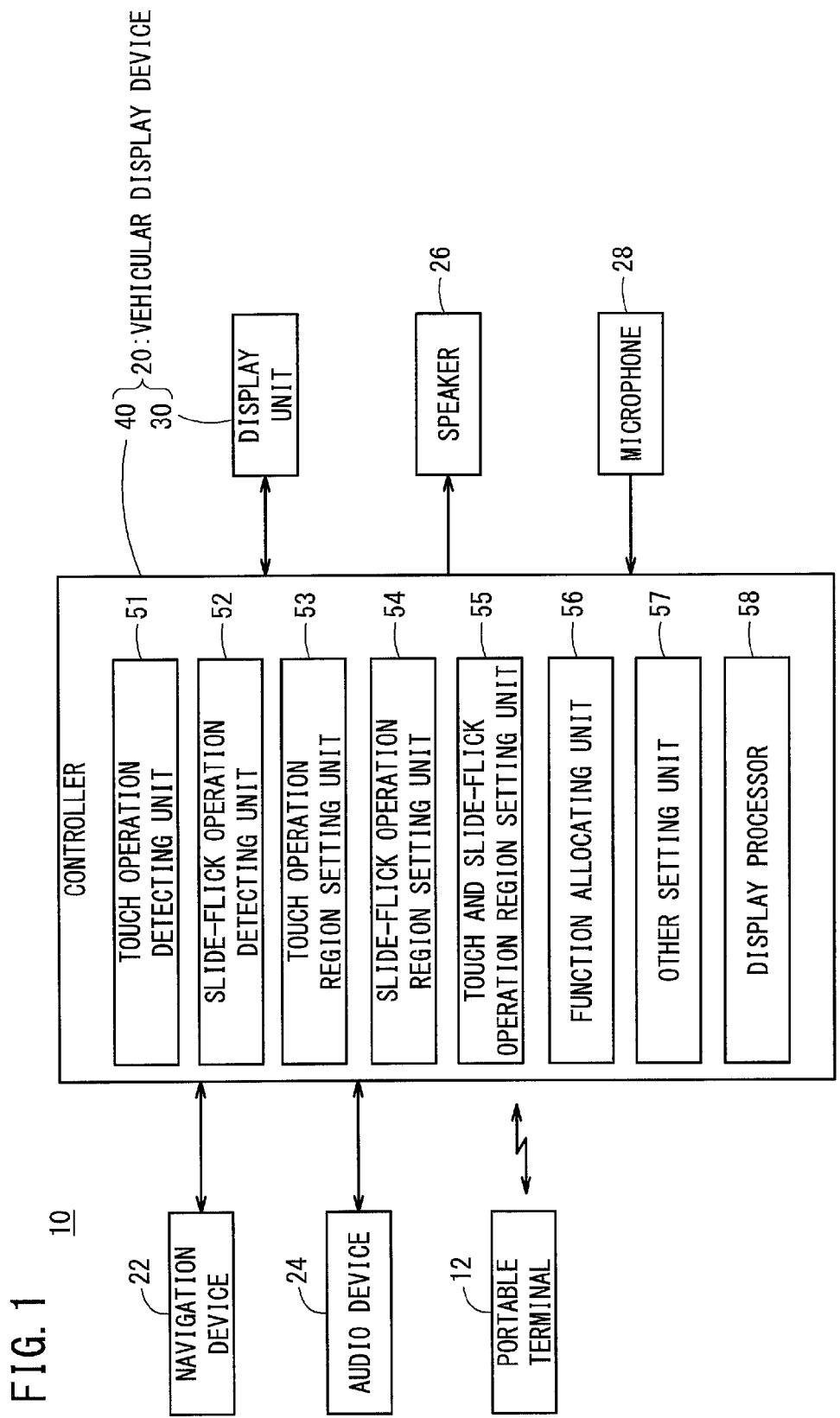
FIG. 1 is a block diagram showing a schematic configuration of a vehicular electronic device according to an embodiment of the present invention.

FIG. 1 is a block diagram showing a schematic configuration of a vehicular electronic device 10 according to the embodiment. As shown in FIG. 1, the vehicular electronic device 10 according to the embodiment is equipped with a vehicular display device 20.

Figure 2:
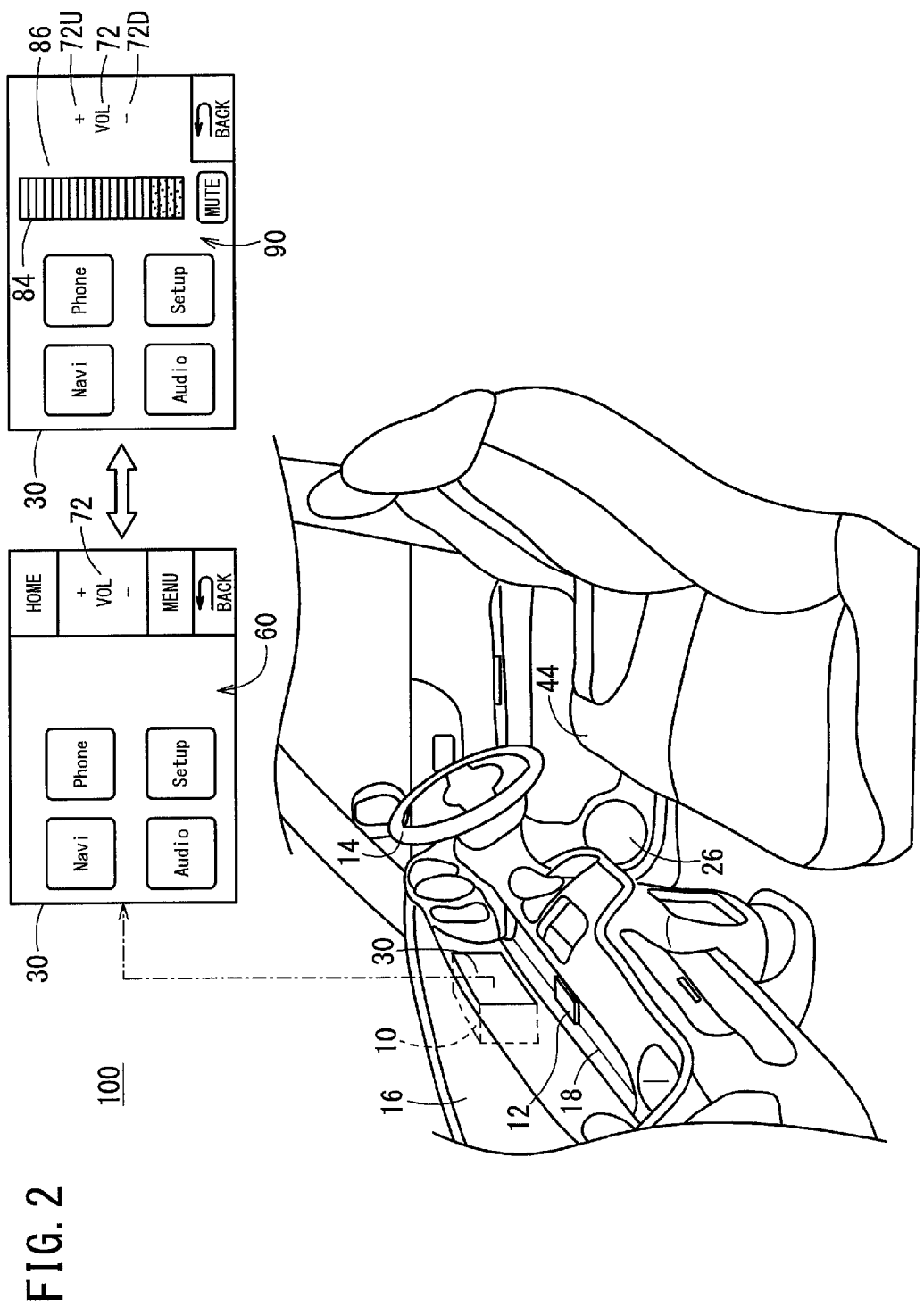
FIG. 2 is an interior schematic view showing the vehicular electronic device mounted in a dashboard of a vehicle.

FIG. 2 is an interior schematic view showing a state in which the rectangular vehicular electronic device 10, which is mounted in a unit casing, is installed in a substantially central portion in the horizontal direction of a dashboard 16 of the vehicle 100.

The vehicular display device 20 that constitutes the vehicular electronic device 10, as shown in FIG. 1, is equipped with a touch panel type display unit 30, and a controller (also referred to as a display controller) 40, which detects a touch operation made with respect to the display unit 30, and a slide operation or a flick operation (the operation of at least one of the slide operation and the flick operation will hereinafter also be referred to as a slide-flick operation, or a slide operation-flick operation), together with displaying various images on the screen of the display unit 30.

As the type of display unit 30, any appropriate type can be used, such as an electrostatic capacitance type, a pressure resistive film type, an infrared sensing type, a pressure sensor, etc. In the present embodiment, an electrostatic capacitance type is adopted. Moreover, although concerning the display device of the display unit 30, a liquid crystal display device is used, the invention is not limited by this feature.

As can be understood from FIG. 2, in the present embodiment, the vehicle 100 is a right-hand steering vehicle, and the display unit 30 thereof is arranged in a generally central position of a dashboard (instrument panel) 16 that extends in the horizontal direction, for example. In addition, a touch operation and a slide operation-flick operation made by a fingertip of the left hand, which has been taken away from the steering wheel 14, of a driver (not shown) who is seated in the driver's seat 44 are possible. The entire front side surface of the display unit 30 is configured to be operable as a touch panel.

Further, even in the case of a left-hand steering vehicle, since the display unit 30 thereof is arranged in a generally central position of the dashboard (instrument panel) 16, for example, a touch operation and a slide operation-flick operation made by a fingertip of the right hand, which has been taken away from the steering wheel 14, of a driver who is seated in the driver's seat 44 are possible.

As shown in FIG. 1, the vehicular electronic device 10 is constituted from the vehicular display device 20, a navigation device 22 that is connected respectively over wires or wirelessly to the controller 40 of the vehicular display device 20, an audio device 24, speakers 26, a microphone 28, and a portable terminal 12.

The navigation device 22, the audio device 24, the controller 40, and the display unit 30 are incorporated integrally with the vehicular electronic device 10, and as shown in FIG. 2, the speakers 26 are arranged on both sides of a front kick panel of the vehicle 100, the microphone 28 is arranged on a roof position above a non-illustrated rearview mirror, and the portable terminal 12 of the user is arranged on a dashboard panel 18.

The controller 40 is constituted from an ECU (electronic control unit). The ECU is a calculator that includes a microcomputer, and further has a CPU (central processing unit), a ROM (including an EEPROM) serving as a memory, a RAM (random access memory), and apart therefrom, input/output devices such as an A/D converter, a D/A converter, etc., and a timer. By reading out and executing programs that are stored in the ROM based on various inputs, the CPU functions as various function implementing units (function implementing means), for example, a controller, a calculator, and a processor, etc.

In the present embodiment, the controller 40 includes the various functions described below. More specifically, the controller 40 includes respective functions as a touch operation detecting unit 51 that detects a touch operation (touch position) of a finger of the user (in the present embodiment, a driver of the vehicle 100) with respect to the display unit 30, a slide-flick operation detecting unit 52 that detects an operation (also referred to as a slide-flick operation) of at least one of a slide operation (movement distance and movement direction), which is a touch position movement operation, and a flick operation (a flick amount or a speed and flick direction), which is an operation of flicking the touch panel type display unit 30 with the fingertip, a touch operation region setting unit 53 that sets a touch operation region validating the touch operation with respect to the display unit 30, a slide-flick operation region setting unit 54 that sets a slide-flick operation region validating the slide operation-flick operation with respect to the display unit 30, a touch and slide-flick operation region setting unit 55 that sets a touch and slide flick operation region in which both of the touch operation and the slide operation-flick operation are enabled, a function allocating unit (function setting unit) 56 that allocates various respective functions such as a volume increase/decrease function, etc., in respective operation regions of the display unit 30 that are set according to the respective operation region setting units 53 through 55, an other settings unit 57, to be described later, which sets other functions apart from those described above, and a display processor 58 that carries out screen displays of the display unit 30 responsive to the aforementioned various functions 51-57.

The touch and slide-flick operation region, which is set by the touch and slide-flick operation region setting unit 55 is a so-called logical sum (OR) region of the touch operation region, which is set by the touch operation region setting unit 53, and the slide-flick operation region, which is set by the slide-flick operation region setting unit 54, and therefore, may be omitted. Further, concerning the slide operation-flick operation, in the case that the movement direction-flicking direction of the touched position of a user's finger is moved in a slanted direction, then the slide operation-flick operation is divided into a horizontal component and a vertical component to enable detection thereof.

In this case, by monitoring the trajectory, etc., of the slide operation (i.e., the touch position (touch starting position) of the fingertip, the movement length of the fingertip, the movement speed of the fingertip, the touch cancellation position, etc.), the size and movement speed, etc., of the slide operation can be detected in combination.

Further, by monitoring the trajectory, etc., of the flick operation (i.e., the flicking direction and flicking speed of the fingertip, the touch position and touch cancellation position of the fingertip, etc.), the size and movement speed, etc., of the flick operation can be detected in combination.

The amount of increase/decrease (adjustment amount) of the volume in accordance with various components can be set and changed using a various settings/changes button 108 (see FIG. 3A), and by the other settings unit 57.

Figure 3A:
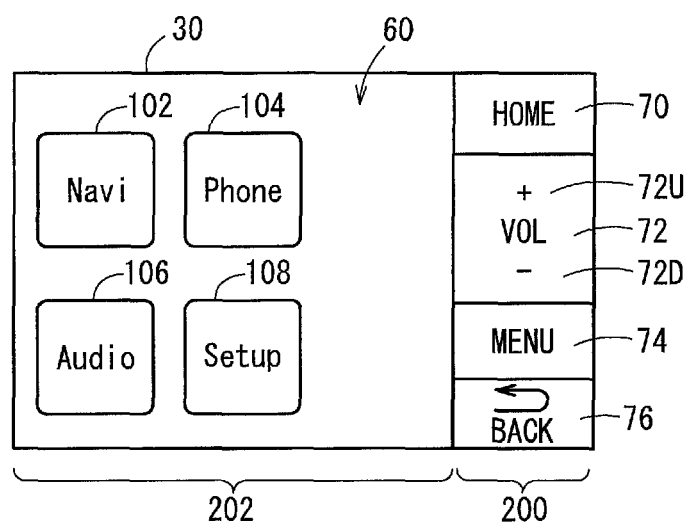
FIG. 3A is a view showing a display example of a home screen that is displayed on a display unit.

FIG. 3A is a view showing a display example of a so-called home screen 60 of the vehicular display device 20, which is displayed on the display unit 30. The total display area of the display unit 30 basically is divided into a basic operation display area (also referred to simply as a display area) 200, which occupies roughly ¼ of a right-hand side in the horizontal direction, and an applied operation display area (also referred to simply as a display area) 202, which occupies roughly ¾ of a left-hand side in the horizontal direction.

On the home screen 60, in the applied operation display area 202, there are displayed a navigation selection button 102 (indicated by "Navi"), a portable terminal selection button 104 (indicated by "Phone"), an audio selection button 106 (indicated by "Audio"), and the various settings/changes button 108 (indicated by "Setup"), which are set by the touch operation region setting unit 53.

Further, on the home screen 60, in the basic operation display area 200, there are displayed in order from an upper side in the vertical direction, a home button 70 (indicated by "HOME"), a reference volume switch region 72 (indicated by "VOL") including a volume increase/decrease switch (referred to as increase/decrease switches 72U, 72D, or as an increase switch 72U and a decrease switch 72D) indicated by the displays "+" and "−", a menu button 74 (indicated by "MENU"), and a return button 76 (displayed by a bent arrow with the term "BACK"), which are set by the touch operation region setting unit 53.

Figure 3B:
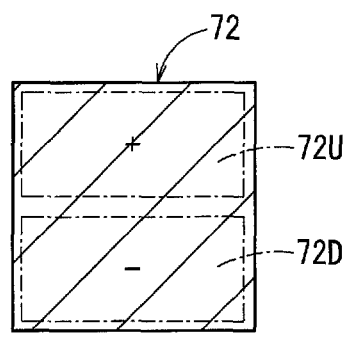
FIG. 3B is an explanatory drawing of a touch operation region for a volume increase/decrease switch, in the home screen.

In a condition in which the home screen 60 of FIG. 3A is displayed, concerning the reference volume switch region 72, as shown in FIG. 3B, through operation of the touch operation region setting unit 53, an upper half range thereof, which is indicated by "+", is set to a touch operation region for the volume increase switch 72U, and a lower half range thereof, which is indicated by "−", is set to a touch operation region for the volume decrease switch 72D.

In the present embodiment, if it is necessary to indicate the touch operation region in which the touch operation is to be detected, as shown in FIG. 3B, in the drawings, the region is rendered by lower left-hand oriented hatching. Further, as will be discussed later, in the present embodiment, if it is necessary to indicate the slide-flick operation region in which the slide operation-flick operation is to be detected, in the drawings, the region is rendered by lower right-hand oriented hatching. Furthermore, as will be discussed later, in the present embodiment, if it is necessary to indicate the touch and slide-flick operation region in which both the touch operation and the slide operation-flick operation are to be detected, in the drawings, the region is rendered by crosshatching.

[Basic Method of Using the Vehicular Electronic Device 10]

Next, before describing how to set the operation area of the volume switch in accordance with the essential feature of the present invention, first, to facilitate understanding of the invention, an outline description will be given concerning a basic method of using the vehicular electronic device 10.

On the home screen 60 of FIG. 3A, when the controller 40 detects through the touch operation detecting unit 51 that a touch operation has been made to the navigation selection button 102, then through the display processor 58, a map is displayed in the display area 202. Further, when a touch operation to the menu button 74 is detected in a state in which the map is displayed in the display area 202, a destination setting screen is displayed over the displayed map, and when a destination is set along the display, a guidance route from the current position to the destination is displayed on the map. A user such as the driver or the like can utilize the navigation function (route guidance function, etc.) in accordance with the guidance route that is displayed on the map.

During use of the navigation function, when the controller 40 detects through the touch operation detecting unit 51 that a touch operation has been made to the home button 70, the controller 40 goes back to the home screen 60.

Next, on the home screen 60, when a touch of the audio selection button 106 is detected, switching is carried out among screens (screens displayed in the display area 202) that enable listening or viewing of a radio broadcast or a television program, or replaying of a CD (compact disc), and in the same manner as the features described above, a user such as the driver or the like can use the audio function.

Furthermore, on the home screen 60, when the controller 40 detects a touch operation of the portable terminal selection button 104, a telephone number input screen is displayed, and by detecting the input of a telephone number on the displayed telephone number input screen, using the speakers 26 and the microphone 28, it is possible to make use of a hands-free phone function with the exterior via the portable terminal 12 and a mobile communications network.

Further still, on the home screen 60, when the controller 40 detects that a touch operation has been made to the various settings/changes button 108, the functions of the other settings unit 57 are enabled, whereby setting of brightness or setting of character size, etc., of the display unit 30 can be carried out.

The above description is a general outline description of the basic method of using the vehicular electronic device 10.

[Manner of Setting Region Enlargement (Region Expansion) of the Volume Switch Region]

Next, a description will be given concerning the manner of enlarging (expanding) the area of the volume switch operation region, which relates to an operation to increase or decrease the volume of sound that is output from the speakers 26 of the vehicular display device 20 of the vehicular electronic device 10, in accordance with the essential feature of the present invention.

Figure 4:
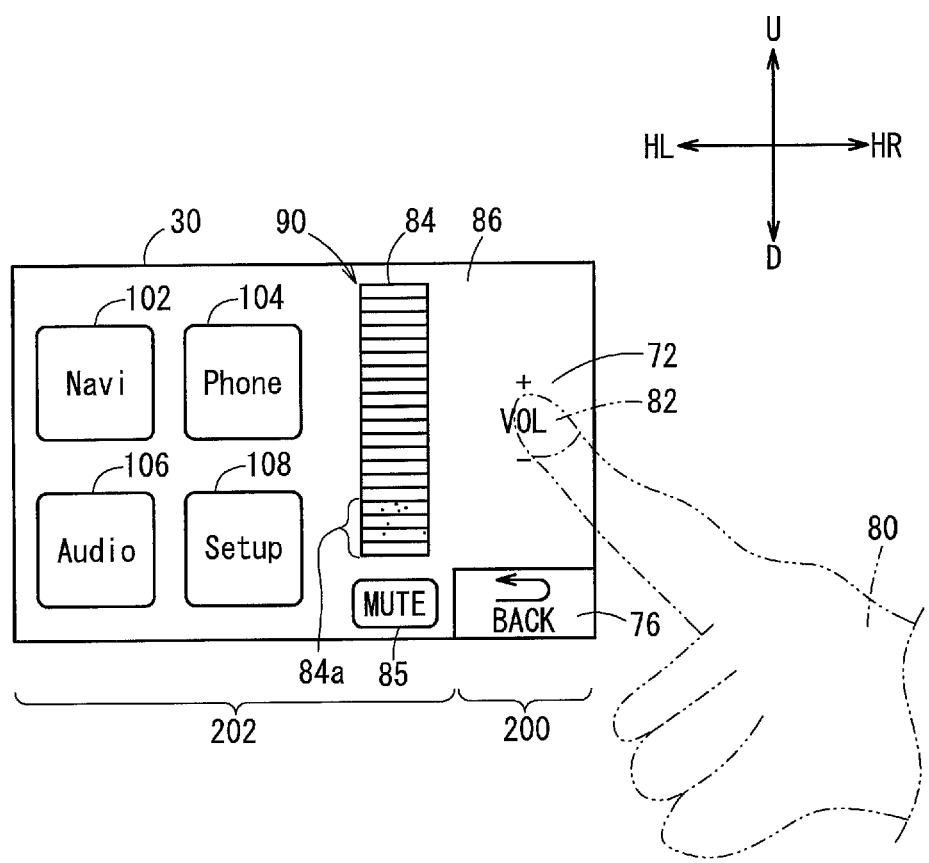
FIG. 4 is an explanatory drawing of a volume increase/decrease operation enabling screen.

In a state in which the home screen 60 shown in FIG. 3A is displayed on the display unit 30 by the display processor 58, when the driver performs a volume increase/decrease operation, as shown in FIG. 4, for example when the vehicle is parked, the driver takes his or her left hand 80 away from the steering wheel 14, and touches the reference volume switch region 72 with the finger (fingertip) 82 of the left hand 80. In a state before being touched, as shown in FIG. 3B, the reference volume switch region 72 is set to the touch operation region by the touch operation region setting unit 53.

Therefore, when the touch operation of the finger 82 with respect to the reference volume switch region 72 is detected by the touch operation detecting unit 51, the touch operation region setting unit 53, the slide-flick operation region setting unit 54, and the touch and slide-flick operation region setting unit 55, as shown in FIG. 4, carry out through the display processor 58 the display of a vertically elongated volume gauge 84 (also referred to as an enlarged volume switch region), which is displayed in the form of a stack of small horizontally elongate rectangles, on the left side of the reference volume switch region 72 together with displaying a mute button 85 below the volume gauge 84.

In FIG. 4, a volume increase/decrease operation enabling screen 90 is shown, which is switched to from the home screen 60, by a touch operation made with respect to the reference volume switch region 72. In the volume increase/decrease operation enabling screen 90, a region of the stacked body in which multiple dots are drawn downwardly in the volume gauge 84 indicates a current volume amount (volume level) 84a. The volume level 84a can be displayed together with a numerical value in the gap between the volume gauge 84 and the mute button 85.

In FIG. 4, the vertical and horizontal crossed lines, which are drawn to the upper right of the display unit 30, indicate, respectively, an upper direction U, a downward direction D, a horizontal leftward direction HL, and a horizontal rightward direction HR.

Figure 5:
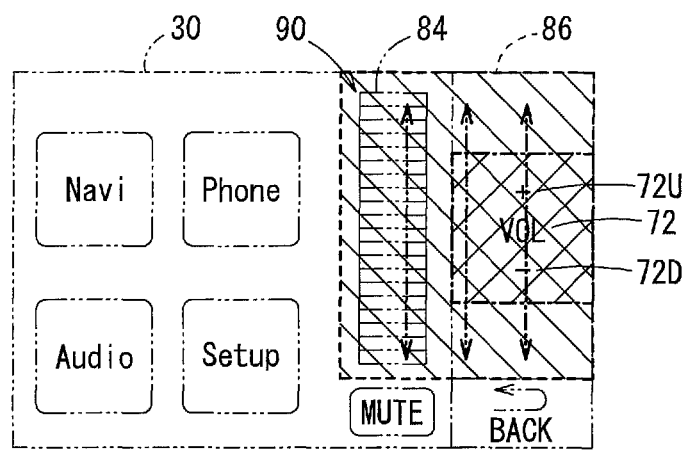
FIG. 5 is an explanatory drawing of an extended range of a volume increase/decrease operation region.

In the volume increase/decrease operation enabling screen 90 shown in FIG. 4 (in a display state in which a volume increase/decrease operation is enabled), as shown in FIG. 5, an enlarged volume switch region 86, surrounded by a dashed line inside of which lower right-hand oriented hatching is shown, serves as a slide-flick operation region, which is set by the slide-flick operation region setting unit 54, for detecting a slide operation-flick operation (in FIG. 5, a movement direction of the touch position in directions shown schematically by the two-dot dash vertical lines with arrows on both sides thereof) of a vertical direction (component).

In this case, it should be kept in mind that the character display "HOME" indicating the home button 70, and the character display "MENU" indicating the menu button 74 are canceled (not displayed). More specifically, with the volume increase/decrease operation enabling screen 90 shown in FIGS. 4 and 5, the regions of the home button 70 and the menu button 74 also are extended into the vertically directed slide-flick operation region.

Furthermore, with the volume increase/decrease operation enabling screen 90 shown in FIGS. 4 and 5, the entirety of the reference volume switch region 72 is set to the vertically directed slide-flick operation region by the slide-flick operation region setting unit 54. Together therewith, the region of the increase switch 72U, which is the upper-half region of the reference volume switch region 72, remains set to the touch operation region to increase the volume, and the region of the decrease switch 72D, which is the lower-half region of the reference volume switch region 72, remains set to the touch operation region to decrease the volume. Stated otherwise, the entirety of the reference volume switch region 72 is set to a region in which both a touch operation and a slide operation-flick operation can be detected by the touch and slide-flick operation region setting unit 55.

The action to detect the vertically directed slide operation-flick operation (refer to the up direction U and the down direction D in FIG. 4) by the slide-flick operation detecting unit 52 is an operation to detect a vertically directed slide operation component or a vertically directed flick operation component. Therefore, if the user's finger 82 is moved in a slanted direction, the controller 40 increases or decreases the volume of the speakers 26 corresponding to the movement length and flicking force, etc., of the vertically oriented component that is detected by the slide-flick operation detecting unit 52. A certain level increased or decreased with one slide operation (one slide action) or one flick operation (one flick action), by using the various settings/changes button 108, can also be changed by the other settings unit 57.

Within the volume increase/decrease operation enabling screen 90 in FIGS. 4 and 5, when the finger 82 makes a slide operation-flick operation upwardly from below in the enlarged volume switch region 86, the volume (sound level) of the sound output from the speakers 26 is increased, whereas when the finger 82 makes a slide-flick operation downwardly from above, the volume of the sound output from the speakers 26 is decreased.

During the display of the volume increase/decrease operation enabling screen 90 shown in FIG. 4, when the display processor 58, through the touch operation detecting unit 51, detects that the finger 82 has been separated a predetermined time from the display unit 30, or stated otherwise, when it is detected that the touch operation or slide operation with respect to the display unit 30 has not been performed for a predetermined time, it is regarded that the volume increase/decrease operation is completed, whereupon the display switches to the home screen 60. The predetermined time, which is a time over which touching is not performed, can be set beforehand in a timer to a desired time by the various settings/changes button 108.

The volume increase/decrease operation is not limited to a time when the home screen 60 is displayed. During use of the navigation function, during use of the audio function, or during use of the hands-free phone function as well, basically, when it is detected that a touch operation has been made to the reference volume switch region 72, which is displayed at all times, the volume increase/decrease operation enabling screen 90, in which the volume gauge 84 is displayed, for example, with a translucent display, is activated, and the volume increase/decrease operation, as was explained with reference to FIGS. 4 and 5, can be carried out.

In the aforementioned embodiment, a so-called best embodiment (best mode), in a state in which the home screen 60, etc., is displayed (FIG. 3A), and when the user touches the reference volume switch region 72, the enlarged volume switch region 86 (see FIG. 5) including the reference volume switch region 72 that makes up the touch operation region is set, together with displaying the volume gauge 84 (see FIG. 4) within the enlarged volume switch region 86.

When the controller 40 detects a vertically directed slide-flick operation within the enlarged volume switch region 86 (also including the reference volume switch region 72), or a touch operation within the reference volume switch region 72, then responsive to the slide-flick operation or the touch operation, a volume increase/decrease of the speakers 26 is performed, and corresponding to the increase/decrease in volume, the display area of the volume level 84a of the volume gauge 84 increases or decreases.

As described above, when the touch operation to the reference volume switch region 72 that includes the volume increase/decrease switch 72U, 72D is detected, since a widened region, which includes the reference volume switch region 72 and the other volume switch region that differs from the reference volume switch region 72, is set to the volume switch region (enlarged volume switch region 86), the user can easily carry out an operation to increase/decrease the volume of the speakers 26 by the volume switch that is displayed in the widened region.

Next, descriptions will be given of various exemplary embodiments of vehicular display devices 20 constituting vehicular electronic devices 10 according to other embodiments, apart from the vehicular display device 20 that constitutes the vehicular electronic device 10 according to the above-described embodiment.

Descriptions of Examples According to Other Embodiments

First Exemplary Embodiment

The configuration of the vehicular display device 20A according to a first exemplary embodiment of another embodiment to be described below, which is equipped with the touch panel type display unit 30, and the controller 40, which sets the operation region on the display unit 30, detects an operation made with respect to the set operation region, and controls the display of the display unit 30, is the same as the vehicular display device 20 shown in FIG. 1.

In the vehicular display device 20A according to the first exemplary embodiment, concerning the home screen 60, in which the volume increase/decrease switches 72U, 72D are displayed alongside one another horizontally, in addition to the home screen 60 shown in FIG. 3A (shown again in FIG. 6A), the home screen 60A shown in FIG. 6C can also be selected. To facilitate understanding and to avoid complexity, in the home screen 60A shown in FIG. 6C, constituent elements and corresponding constituent elements thereof, which are the same as the constituent elements of the home screen 60 described above, are denoted by the same reference characters, and detailed description of such features is omitted.

In the case that the reference volume switch region 72 is displayed in the operation region of the display unit 30, as shown in the home screen 60 of FIG. 6A, when it is detected that a touch operation has been made within the reference volume switch region 72, as shown in the vehicular display device 20A according to the first exemplary embodiment of FIG. 6B, the controller 40 displays in the display unit 30, in a direction (horizontal direction) perpendicular to the alignment direction (vertical direction) of the increase/decrease switches 72U, 72D of the reference volume switch region 72, an appropriate volume increase/decrease operation enabling screen 90A, in which a volume switch region 120, which is of the same vertical width as the reference volume switch region 72, and which is another region different from the reference volume switch region 72, is displayed as an operation region.

In the volume increase/decrease operation enabling screen 90A, an operation made within the other volume switch region 120 also is detected as a volume increase/decrease operation.

With the volume increase/decrease operation enabling screen 90A, the driver, for example when the vehicle is parked, removes the left hand away from the steering wheel 14, extends the left arm in a leftward direction, and touches the reference volume switch region 72.

When touched, since the other volume switch region 120 is set in a substantially horizontal leftward direction, which is the direction of movement of the arm, the volume switch region is enlarged substantially horizontally, and the volume switch region 120 becomes enlarged in the direction in which the arm has been moved, the volume switch region 120 is enlarged in a direction that coincides with the direction of movement of the arm of the user, and therefore, the operation (volume increase/decrease operation) to increase or decrease (adjust) the volume is easy to carry out.

More specifically, the other volume switch region 120 is set horizontally to the reference volume switch region 72, and the widened volume switch region 120 is set in the same direction as the movement direction (substantially horizontal direction) of the arm used by the driver for operating the reference volume switch region 72. Therefore, the operation to increase or decrease the volume can be carried out smoothly.

On the other hand, as shown in the home screen 60A of FIG. 6C, in the case that the reference volume switch region 72A, with the volume increase/decrease switches 72U, 72D displayed horizontally alongside, is displayed in the operation region of the display unit 30, when it is detected that a touch operation has been made within the reference volume switch region 72A, as shown in the (modification of the) vehicular display device 20A according to the first exemplary embodiment of FIG. 6D, the controller 40 displays in the display unit 30, in a direction (vertical direction) perpendicular to the alignment direction (horizontal direction) of the increase/decrease switches 72U, 72D of the reference volume switch region 72A, an appropriate volume increase/decrease operation enabling screen 90Aa, in which a volume switch region 122, which is of the same horizontal width as the reference volume switch region 72A, and which is another region different from the reference volume switch region 72A, is displayed as an operation region.

In the volume increase/decrease operation enabling screen 90Aa, an operation made within the other volume switch region 122 also is detected as a volume increase/decrease operation.

With the vehicular display device 20A according to the first exemplary embodiment (FIGS. 6A to 6D), by way of a touch operation made to the reference volume switch region 72, 72A that includes the volume increase/decrease switches 72U, 72D, the widened volume switch region, which includes both the reference volume switch region 72, 72A and the other volume switch region 120, 122, is set to the volume switch region. Therefore, the operation (volume increase/decrease operation) to increase or decrease the volume is made easier.

In this case, based on a touch operation made to the various settings/changes button 108, and by the other settings unit 57 thereof, the controller 40 can select the alignment direction of the increase/decrease switches 72U, 72D to be displayed in either one of a horizontal direction, as shown in FIG. 6C, or a vertical direction, as shown in FIG. 6A.

With the vehicular display device 20A according to the first exemplary embodiment shown in FIGS. 6B and 6D, the positions in which the other functions of the display unit 30, which are set by the function allocating unit 56, etc., are arranged, or the direction in which the widened volume switch region is set corresponding to the preference of the user, can be selected.

When the other volume switch region 120 is set to the vertically directed slide-flick operation region, and the other volume switch region 122 is set to the horizontally directed slide-flick operation region, the volume increase/decrease operation becomes easy to perform. Naturally, a modification can be made to set the other volume switch regions 120, 122 also as a touch region, and to set the regions of the increase/decrease switches 72U, 72D of the reference volume switch regions 72, 72A so as to be enlarged up and down in the horizontal direction (FIG. 6B), or enlarged to the left and right in the vertical direction (FIG. 6D).

Second Exemplary Embodiment

The controller 40 may display the other horizontally set volume switch region 120 (see FIG. 6B) on the vehicular display device 20B according to the second exemplary embodiment of FIG. 7A, and further, may set the enlarged volume switch region 124, which is enlarged in the vertical direction, to the operation region, to thereby display an appropriate volume increase/decrease operation enabling screen 90B.

With the volume increase/decrease operation enabling screen 90B, by providing a configuration in which an operation within the enlarged volume switch region 124 is detected as the volume increase/decrease operation, a region can be provided in which there is included the enlarged volume switch region 124 for which the volume switch region thereof is further widened, and the volume increase/decrease operation can be further facilitated. With the enlarged volume switch region 124, there can be permitted a slide operation, a flick operation, or a vertically bisected touch operation, which is bisected in the vertical direction by a line of extension of a vertical bisector of the reference volume switch region 72 (an increase operation in the upper half, a decrease operation in the lower half).

Third Exemplary Embodiment

As shown in the vehicular display device 20C according to the third exemplary embodiment of FIG. 7B, the controller 40 performs the following: with respect to the reference volume switch region 72, which is set to the touch operation region, the enlarged volume switch region 124 is set to a slide-flick operation region that detects a vertically directed slide operation-flick operation, and an appropriate volume increase/decrease operation enabling screen 90C is displayed, whereby ease of operation of the volume increase/decrease operation is improved.

As a tentative explanation, assuming that the touch operation is applied in the same manner to the reference volume switch region 72 and also to the enlarged volume switch region 124, in the case that the volume gauge 84 or the like is displayed in the enlarged volume switch region 124, and in the case that the volume level 84a (see FIG. 4) of the volume gauge 84 is a small value at a lower position than an upper limit of a decrease switch region of the volume increase/decrease switch (increase switch 72U and decrease switch 72D) that is displayed in the reference volume switch region 72, then although the user attempts to increase the volume, and the increase is in a direction more upwardly than the volume level 84a of the volume gauge 84, if a touch operation is made to a region more downwardly than the upper limit position of the decrease switch 72D, then conversely, there is the possibility for a mistaken operation to occur in which the volume is reduced. In relation to this problem, according to the vehicular display device 20C of the third exemplary embodiment that is shown in FIG. 7B, by disallowing the touch operation within the enlarged volume switch region 124 and setting the same only to a slide-flick operation region, such a mistaken operation can be prevented beforehand.

Fourth Exemplary Embodiment

As shown in the vehicular display device 20D according to the fourth exemplary embodiment of FIG. 7C, the controller 40 may set a region 126, which includes the reference volume switch region 72 that is set to the touch operation region and extends over a vertical length of the enlarged volume switch region 86 (see FIG. 5) that resides upwardly and downwardly of the reference volume switch region 72, to the slide-flick operation region in which the vertically directed slide operation-flick operation is detected, and an appropriate volume increase/decrease operation enabling screen 90D may be displayed.

Figure 8A:
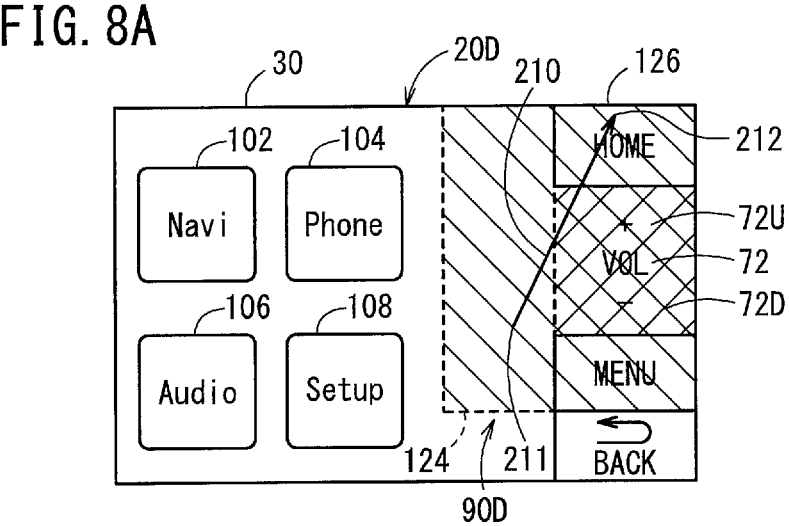
FIG. 8A is an explanatory drawing of a volume increase performed by a slanted slide operation-flick operation on a display unit of a vehicular display device according to the fourth exemplary embodiment.

If set in this manner, for example, as shown by the arrow 210 in FIG. 8A, when the vertically directed slide operation-flick operation is performed in the enlarged volume switch region 124, even in the case that the operation is performed at a slant from the touch position 211 to the touch cancellation position 212, and the slide operation-flick operation enters into the reference volume switch region 72 and positions above and below the same, the operation continues within the reference volume switch region 72 and in the positions above and below the same, resulting in a valid volume increase/decrease operation (an increase operation in FIG. 8A) by the slide operation-flick operation, whereby the operability of the volume increase/decrease operation can be significantly enhanced.

Fifth Exemplary Embodiment

Furthermore, as shown in the vehicular display device 20E according to the fifth exemplary embodiment of FIG. 7D, when other function switches exist upwardly and downwardly of the reference volume switch region 72, in the fifth exemplary embodiment the home button 70 and the menu button 74, the controller 40 may display a volume increase/decrease operation enabling screen 90E, corresponding to a situation in which operations of the home button 70 and the menu button 74 are rendered invalid, and the regions of the other function switches, which have been rendered invalid, may be set to the vertically directed slide-flick operation region. In this manner, by invalidating the other function switches that originally reside upwardly and downwardly of the reference volume switch region 72, and setting them to the volume slide-flick operation region, during a volume operation, mistaken operation of the other function switches in the vicinity of the reference volume switch region 72 can be prevented beforehand.

Figure 8B:
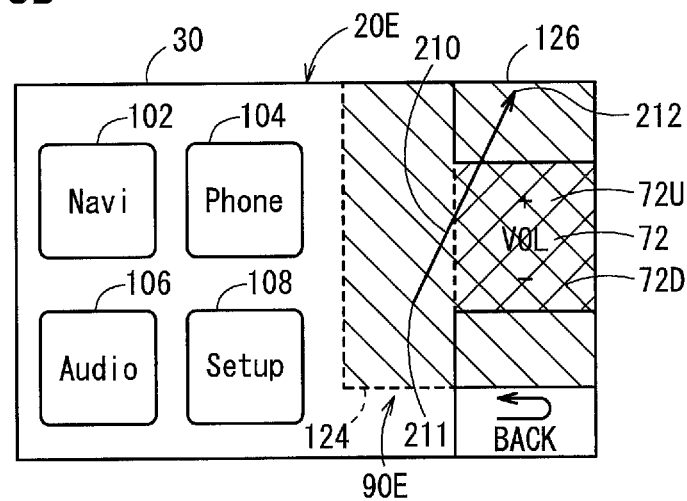
FIG. 8B is an explanatory drawing of a volume increase performed by a slanted slide operation-flick operation on a display unit of the vehicular display device according to the fifth exemplary embodiment.

In this case as well, in the same manner as was explained with reference to FIG. 8A, as shown by the arrow 210 of FIG. 8B, even in the case that the operation is performed at a slant from the touch position 211 to the touch cancellation position 212, the operation continues within the reference volume switch region 72 and in positions above and below the same, resulting in a valid volume increase/decrease operation (an increase operation in FIG. 8B) by the slide operation-flick operation, whereby the operability of the volume increase/decrease operation can be significantly enhanced.

Sixth Exemplary Embodiment

Figure 9:
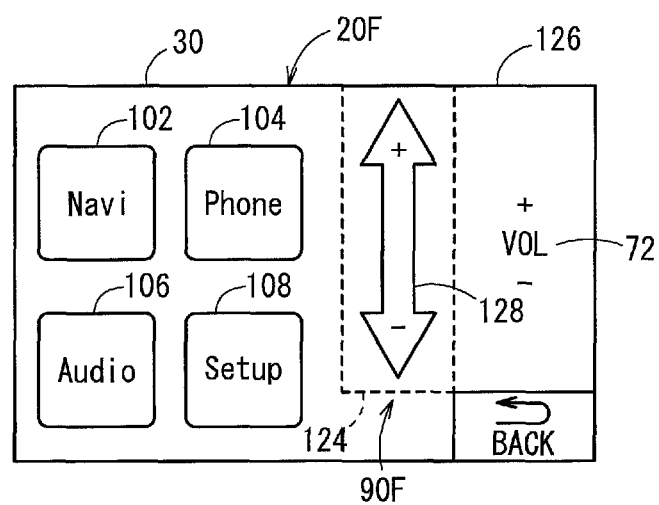
FIG. 9 is an explanatory drawing of a volume increase/decrease operation enabling screen of a vehicular display device according to a sixth exemplary embodiment.

In this case, as shown in the vehicular display device 20F according to the sixth exemplary embodiment of FIG. 9, the controller 40 displays within the enlarged volume switch region 124 a GUI (graphical user interface) 128, in which it can be recognized that the vertically directed slide operation-flick operation within the enlarged volume switch region 124 is a volume increase/decrease operation. Thus, in a user friendly manner, the direction that enables the volume increase/decrease operation can be recognized intuitively by the user. In the example of FIG. 9, the GUI 128 is displayed as a double-headed arrow in which the markings "+" and "−" are displayed inside of the arrow frame.

The GUI 128 may also be displayed inside of the volume switch region 120 of FIG. 6B. The GUI 128 may also be displayed, as horizontally oriented, inside of the volume switch region 122 of FIG. 6D. The GUI 128 may also be displayed inside of the enlarged volume switch region 124 of FIGS. 7A to 7D.

As the GUI, the volume switch region 120 of FIG. 6B, the volume switch region 122 of FIG. 6D, and the enlarged volume switch region 124 of FIGS. 7A to 7D, respectively, may be displayed together with an outer frame.

Best Embodiment

As indicated in the vehicular display device 20 according to the fourth embodiment, if the GUI 128 is configured as a volume gauge 84 in which the current volume level 84a is displayed on the gauge, then the current volume level 84a can be confirmed at a glance.

The present invention is not limited to the above-described embodiments, and it goes without saying that various alternative configurations could be adopted therein, based on the content disclosed in the present specification.

The invention claimed is:

1. A vehicular electronic device comprising:
a touch panel type display unit; and
a controller configured to set an operation region in the display unit, detect an operation performed in the set operation region, and control a display of the display unit;
wherein the controller:
in a case that a reference volume switch region is displayed including a volume increase/decrease switch in the operation region of the display unit, and a touch operation inside of the reference volume switch region is detected,
sets, in the display unit, as the operation region a volume switch region, which is another region differing from the reference volume switch region, in a direction that lies perpendicular to the alignment direction of the increase/decrease switch of the reference volume switch region, and detects as a volume increase/decrease operation an operation that is made within the volume switch region, wherein the volume switch region, which is the other region differing from the reference volume switch region, is continuous with the reference volume switch region.

2. The vehicular electronic device according to claim 1, wherein the controller sets an alignment direction of the increase/decrease switch to be one of a horizontal direction and an up-down oriented vertical direction.

3. The vehicular electronic device according to claim 2, wherein the controller sets the alignment direction of the increase/decrease switch to the vertical direction, and sets the volume switch region, which is the other region differing from the reference volume switch region, horizontally thereto.

4. The vehicular electronic device according to claim 3, wherein the controller sets as the operation region an enlarged volume switch region, in which the horizontally set volume switch region is further enlarged upwardly and downwardly, and detects an operation within the enlarged volume switch region as the volume increase/decrease operation.

5. The vehicular electronic device according to claim 4, wherein the controller:
enables the operation region to be set to a touch operation region in which touch operation is detected, and a slide-flick operation region in which slide operation or flick operation is detected; and
with respect to the reference volume switch region, which is set to the touch operation region, sets the enlarged volume switch region to the slide-flick operation region in which the vertically directed slide operation or flick operation is detected.

6. The vehicular electronic device according to claim 5, wherein the controller also sets a region, which includes the reference volume switch region that is set to the touch operation region and extends over a vertical length of the enlarged volume switch region that resides upwardly and downwardly of the reference volume switch region, to the slide-flick operation region in which the vertically directed slide operation or flick operation is detected.

7. The vehicular electronic device according to claim 6, wherein:
when operation regions of other function switches are set upwardly and downwardly of the reference volume switch region,
the controller renders invalid operations of the other function switches that reside upwardly and downwardly of the reference volume switch region, and the operation regions of the other function switches, which have been rendered invalid, are set to the vertically directed slide-flick operation region.

8. The vehicular electronic device according to claim 5, wherein the controller displays within the volume switch region and within the enlarged volume switch region a graphical user interface (GUI), in which it can be recognized that the vertically directed slide operation or flick operation within the volume switch region, and the vertically directed slide operation or flick operation within the enlarged volume switch region are the volume increase/decrease operation.

9. The vehicular electronic device according to claim 8, wherein the GUI is a volume gauge in which a current volume level is displayed on the gauge.

10. The vehicular electronic device according to claim 4, wherein the controller displays within the volume switch region and within the enlarged volume switch region a graphical user interface (GUI), in which it can be recognized that vertically directed slide operation or flick operation within the volume switch region, and vertically directed slide operation or flick operation within the enlarged volume switch region are the volume increase/decrease operation.

11. The vehicular electronic device according to claim 10, wherein the GUI is a volume gauge in which a current volume level is displayed on the gauge.

12. The vehicular electronic device according to claim 1, wherein the display unit is arranged in a position away from a steering wheel where operation made by a fingertip of a hand, which has been taken away from the steering wheel, of a driver is possible.

13. The vehicular electronic device according to claim 1, wherein the display unit is arranged in a generally central position of a dashboard where operation made by a fingertip of a hand of a driver who is seated in a driver's seat is possible.

14. The vehicular electronic device according to claim 1, wherein the touch panel type display unit is disposed on a dashboard of a vehicle in which the vehicular electronic device is provided.

* * * * *